(12) United States Patent
Nelson et al.

(10) Patent No.: US 8,107,212 B2
(45) Date of Patent: Jan. 31, 2012

(54) APPARATUS AND METHOD FOR PROTECTING FINGERPRINT SENSING CIRCUITRY FROM ELECTROSTATIC DISCHARGE

(75) Inventors: Richard Brian Nelson, Chandler, AZ (US); Richard Alexander Erhart, Tempe, AZ (US); Armando Leon Perezselsky, Mesa, AZ (US)

(73) Assignee: Validity Sensors, Inc., San Jose, CA (US)

( * ) Notice: Subject to any disclaimer, the term of this patent is extended or adjusted under 35 U.S.C. 154(b) by 1042 days.

(21) Appl. No.: 11/799,407

(22) Filed: Apr. 30, 2007

(65) Prior Publication Data

US 2008/0267462 A1   Oct. 30, 2008

(51) Int. Cl.
*H01H 47/00* (2006.01)
*H05F 3/02* (2006.01)

(52) U.S. Cl. .................................................. 361/220
(58) Field of Classification Search .................. 361/220
See application file for complete search history.

(56) References Cited

U.S. PATENT DOCUMENTS

| | | |
|---|---|---|
| 4,151,512 A | 4/1979 | Riganati et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |
| 5,305,017 A | 4/1994 | Gerpheide |
| 5,319,323 A | 6/1994 | Fong |
| 5,325,442 A | 6/1994 | Knapp |
| 5,420,936 A | 5/1995 | Fitzpatrick et al. |
| 5,422,807 A | 6/1995 | Mitra et al. |
| 5,543,591 A | 8/1996 | Gillespie et al. |
| 5,569,901 A | 10/1996 | Bridgelall et al. |

(Continued)

FOREIGN PATENT DOCUMENTS

DE   2213813 A1   10/1973

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Ronald W Leja
(74) *Attorney, Agent, or Firm* — Greenberg Traurig LLP; Cecily Anne O'Regan; William C. Cray

(57) ABSTRACT

A fingerprint sensor in accordance with the invention includes a non-conductive substrate providing a first surface onto which a user can apply a fingerprint to be sensed. A sensor circuit is applied to a second surface of the non-conductive substrate opposite the first surface to sense a fingerprint when juxtaposed proximally thereto. An electrostatic discharge conductor is applied to the non-conductive surface and is located between an area where a fingerprint is swiped and the sensor circuit. The electrostatic discharge conductor discharges electrostatic charge resulting from a user swiping a fingerprint across the first surface.

25 Claims, 6 Drawing Sheets

U.S. PATENT DOCUMENTS

| | | |
|---|---|---|
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,999,637 A | 12/1999 | Toyoda et al. |
| 6,002,815 A | 12/1999 | Immega et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,134,340 A | 10/2000 | Hsu et al. |
| 6,157,722 A | 12/2000 | Lerner et al. |
| 6,161,213 A | 12/2000 | Lofstrom |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,259,108 B1 | 7/2001 | Antonelli et al. |
| 6,289,114 B1 | 9/2001 | Mainguet |
| 6,317,508 B1 | 11/2001 | Kramer et al. |
| 6,320,394 B1 | 11/2001 | Tartagni |
| 6,332,193 B1 | 12/2001 | Glass et al. |
| 6,333,989 B1 | 12/2001 | Borza |
| 6,337,919 B1 | 1/2002 | Duton |
| 6,346,739 B1 | 2/2002 | Lepert et al. |
| 6,347,040 B1 | 2/2002 | Fries et al. |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,473,072 B1 | 10/2002 | Comiskey et al. |
| 6,509,501 B2 | 1/2003 | Eicken et al. |
| 6,539,101 B1 | 3/2003 | Black |
| 6,580,816 B2 | 6/2003 | Kramer et al. |
| 6,597,289 B2 | 7/2003 | Sabatini |
| 6,643,389 B1 | 11/2003 | Raynal et al. |
| 6,672,174 B2 | 1/2004 | Deconde et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,838,905 B1 | 1/2005 | Doyle |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,020,591 B1 | 3/2006 | Wei et al. |
| 7,030,860 B1 | 4/2006 | Hsu et al. |
| 7,042,535 B2 | 5/2006 | Katoh et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,577 B1 | 9/2006 | Tschud |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,290,323 B2 | 11/2007 | Deconde et al. |
| 7,308,122 B2 | 12/2007 | McClurg et al. |
| 7,321,672 B2 | 1/2008 | Sasaki et al. |
| 7,360,688 B1 | 4/2008 | Harris |
| 7,379,569 B2 | 5/2008 | Chikazawa et al. |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,911 B2 | 11/2008 | Chou et al. |
| 7,460,697 B2 | 12/2008 | Erhart et al. |
| 7,463,756 B2 | 12/2008 | Benkley |
| 7,505,611 B2 | 3/2009 | Fyke |
| 7,505,613 B2 | 3/2009 | Russo |
| 7,574,022 B2 | 8/2009 | Russo |
| 7,643,950 B1 | 1/2010 | Getzin et al. |
| 7,646,897 B2 | 1/2010 | Fyke |
| 7,681,232 B2 | 3/2010 | Nordentoft et al. |
| 7,751,601 B2 | 7/2010 | Benkley |
| 7,843,438 B2 | 11/2010 | Onoda |
| 7,953,258 B2 | 5/2011 | Dean et al. |
| 8,005,276 B2 | 8/2011 | Dean et al. |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0064892 A1* | 5/2002 | Lepert et al. .............. 438/5 |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |

| | | |
|---|---|---|
| 2004/0129787 A1 | 7/2004 | Saito et al. |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0210271 A1 | 9/2005 | Chou et al. |
| 2005/0219200 A1 | 10/2005 | Weng |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0244277 A1 | 10/2008 | Orsini et al. |
| 2008/0267462 A1* | 10/2008 | Nelson et al. ................ 382/124 |
| 2008/0279373 A1 | 11/2008 | Erhart et al. |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0102567 A1 | 5/2011 | Erhart |
| 2011/0102569 A1 | 5/2011 | Erhart |

FOREIGN PATENT DOCUMENTS

| | | |
|---|---|---|
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| JP | 04158434 A2 | 6/1992 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |

| | | | |
|---|---|---|---|
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Gassend, et al., "Controlled Physical Random Functions", In Proceedings of the 18th Annual Computer Security Conference, Las Vegas, Nevada, Dec. 12, 2002.

BELLAGIODESIGNS.COM (Internet Archive Wayback Machine, www.bellagiodesigns.com date: Oct. 29, 2005).

* cited by examiner

APPARATUS AND METHOD FOR PROTECTING FINGERPRINT SENSING CIRCUITRY FROM ELECTROSTATIC DISCHARGE

BACKGROUND OF THE INVENTION

1. Field of the Invention

This invention relates to electrostatic discharge (ESD) protection and more particularly to ESD protection for fingerprint sensing electronics.

2. Description of the Related Art

Electrostatic discharge (ESD) is a serious problem when dealing with many types of solid state electronics, such as integrated circuits (ICs), due to its ability to damage sensitive circuitry. Electronic components such as ICs may be exposed to ESD from various different sources, the most common of which is the human body. A body capacitance of approximately 150 pF can hold a charge of approximately 0.6 μC, which can generate potentials of several kV. Contact between the body and a grounded IC can generate large enough currents through the IC to significantly damage internal components.

As transistors and other components of ICs continue to shrink in accordance with Moore's law, ESD damage becomes an even greater risk because of the smaller components' inability to withstand large currents. For this reason, many recommend touching or connecting the body to ground prior to touching or handling sensitive electronic components.

The effects of ESD create special problems when dealing with electronics intended for touching by the body. For example, electronic fingerprint sensors allow a user to swipe or press a finger over some portion of the circuit in order to read the user's fingerprint. It would be infeasible as well as inconvenient for a user to have to ground his or her body prior to touching the sensor in order to dissipate an electrostatic charge.

Problems with ESD may be especially pronounced with conventional fingerprint sensors that allow a user to directly touch a piece of silicon. Nevertheless, ESD may also be a concern with newer more advanced "flexible" fingerprint sensors. These sensors may include circuits printed or otherwise applied to flexible, non-conductive materials, such as Kapton® (i.e., polyimide) substrates or other flexible non-conductive materials. These sensors may enable a user to swipe a finger across the polyimide surface without directly contacting the sensor circuitry. Unfortunately, the fact that polyimide is a good insulator allows electrostatic charge to build up on the polyimide surface as a user swipes his or her finger. This charge will continue to increase in potential until the path of least resistance is found and the charge dissipated. In certain cases, the charge may discharge to the sensor circuitry, causing damage to sensitive electronic components such as IC I/O cells.

In view of the foregoing, what is needed is an apparatus and method to safely discharge the electrostatic charge that accumulates on the non-conductive portions of circuits and electronic devices, including those intended for human touch, such as fingerprint sensing circuits.

SUMMARY OF THE INVENTION

The present invention provides an apparatus and method for dissipating the electrostatic charge that accumulates on circuits such as fingerprint sensing circuits. The features and advantages of the present invention will become more fully apparent from the following description and appended claims, or may be learned by the practice of the invention as set forth hereinafter.

In a first aspect of the invention, a fingerprint sensor in accordance with the invention includes a non-conductive substrate providing a first surface onto which a user can apply a fingerprint to be sensed. A sensor circuit is applied to a second surface of the non-conductive substrate opposite the first surface to sense a fingerprint when juxtaposed proximally thereto. An electrostatic discharge conductor is applied to the non-conductive surface and is located between an area where a fingerprint is swiped and the sensor circuit. The electrostatic discharge conductor discharges the electrostatic charge resulting from a user swiping a fingerprint across the first surface.

In a second aspect of the invention, an ESD-protected circuit includes a non-conductive surface onto which an electrostatic charge can accumulate. A circuit which is sensitive to electrostatic discharge is coupled to the non-conductive surface. An electrostatic discharge conductor is coupled to the non-conductive surface and is positioned to discharge electrostatic charge from the non-conductive surface and thereby protect the circuit.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of apparatus and methods in accordance with the present invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
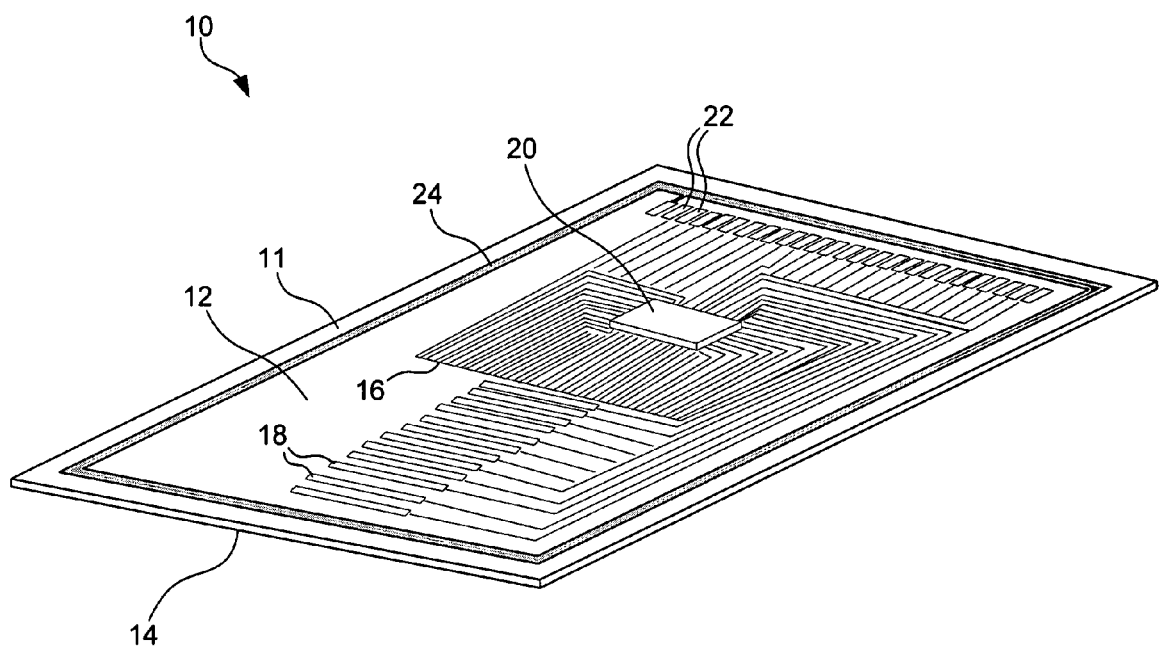
FIG. 1 is a perspective view of one embodiment of a fingerprint sensing circuit having a substrate and an ESD conductor coupled to a first side of the substrate.

Referring to FIG. 1, a fingerprint sensing circuit 10 in accordance with a first embodiment of the invention may include a flexible non-conductive substrate 11 having a circuit side 12 and a sensing side 14. In certain embodiments, the substrate 11 may be constructed of a flexible polyimide material marketed under the trade name Kapton® and with a thickness of between about 25 and 100 µm. The Kapton® polymer allows the fingerprint sensing circuit 10 to be applied to products such as touchpads and molded plastics having a variety of shapes and contours while at the same time providing exceptional durability and reliability. Nevertheless, the invention is not limited to this type of substrate 11 but may include other flexible or rigid substrates 11 suitable for applying a circuit thereon.

In certain embodiments, the fingerprint sensing circuit 10 may include an image sensor 16 to detect the ridges and valleys of a fingerprint as it moves across the sensor 16. Optionally, the fingerprint sensing circuit 10 may include a velocity sensor 18 to detect the speed of a finger moving across the image sensor 16. The image sensor 16 and velocity sensor 18 may include conductive traces printed or otherwise applied to the circuit side 12 of the substrate 11 using any suitable lithographic or application technique. In certain embodiments, the image sensor 16 may be implemented as an array of capacitive sensors capable of sensing the ridges and valleys of a finger as it travels over the sensor 16. Similarly, the velocity sensor 18 may by implemented using two or more capacitive detectors 18 at intervals along the direction of travel of the finger.

The above-mentioned conductive traces may connect the image sensor 16 and velocity sensor 18 to one or more sensor ICs 20 connected to the circuit side 12 of the substrate 11. A sensor IC 20 may contain drive and sense electronics for detecting and reading fingerprints passed over the image sensor 16. In certain embodiments, the sensor IC 20 may be connected to one or more interconnect pads which enable the fingerprint sensing circuit 10 to interface with a processor or other external system. The sensor IC 20 may be bonded to the flexible substrate 11 using any suitable technique such as a chip-on-flex (COF) process. This process may be used to electrically connect the sensor IC 20 to the image sensor 16, velocity sensor 18, and interconnect pads 22 to form the fingerprint sensing circuit 10. In selected embodiments, the fingerprint sensing circuit 10 may be designed with an open architecture in order to utilize the most recent matching algorithms. Such a feature may enable users to fine tune security vs. convenience tradeoffs by selecting a suitable matching algorithm.

Additional information related to the implementation of fingerprint sensing circuits 10 in accordance with the invention is disclosed in U.S. Pat. No. 7,146,024 and entitled "Swiped Aperture Capacitive Fingerprint Sensing Systems and Methods," which is herein incorporated by reference. Other information for implementing fingerprint sensing circuits in accordance with the invention may be found in U.S. Patent Pub. No. 2005/0244038 and entitled "Finger Position Sensing Methods and Apparatus" and U.S. Patent Pub. No. 2006/0083411 and entitled "Fingerprint Sensing Assemblies and Methods of Making," which are also incorporated by reference. The fingerprint sensors disclosed in the above-identified applications are examples of fingerprint sensors that may be used with the ESD protection apparatus disclosed herein and do not represent an exhaustive list. Indeed, the invention disclosed herein may be used with many different types of fingerprint sensors including conventional sensors using silicon to contact and read a user's fingerprint.

One benefit of the fingerprint sensing circuit 10 illustrated in FIG. 1 is that a user's finger is isolated from the image sensor 16, velocity sensor 18 and sensor IC 20. The user's finger is swiped along the polyimide surface of the sensing side 14 of the flexible substrate 11 as opposed to the circuit side 12. The image sensor 16 and velocity sensor 18 are able to detect changes in capacitance as the finger is swiped across the sensing side 14 of the circuit 10. Thus, the polyimide substrate electrically and mechanically isolates the user's finger from the image sensor 16, velocity sensor 18 and sensor IC 20, thereby providing some degree of protection from ESD and mechanical abrasion.

Despite its advantages, however, the flexible polyimide substrate may be susceptible to electrostatic buildup on the sensing side 14 of the substrate 11. This occurs as a result of rubbing two non-conductive surfaces (i.e., a finger and the polyimide substrate) together. Although the polyimide substrate initially provides an effective shield between the fingerprint sensing circuitry and electrostatic charge, the electrostatic charge may continue to build up until the path of least resistance is found and the charge is dissipated. In certain cases, the charge may follow a path around the edge of the substrate 11 until it reaches the circuit side 12 of the substrate. There, the charge may discharge to the sensor circuitry 16, 18, 20, causing damage to sensitive electronic components such as IC I/O cells.

In selected embodiments in accordance with the invention, an ESD conductor 24 may be placed between the sensing side 14 of the fingerprint sensor 10 and the fingerprint sensing circuitry 16, 18, 20. This ESD conductor 24 may be connected to a known potential (e.g., ground) and may be used to safely dissipate electrostatic charge accumulated on the sensing side 14. In certain embodiments, the ESD conductor 24 may be connected to one or more interconnect pads 22, which may be connected to a known potential.

Because the ESD conductor 24 is positioned between the sensing side 14 and the fingerprint sensing circuitry 16, 18, 20, the shortest path, and thus the path of least resistance, is the path between the sensing side 14 and the ESD conductor 24. In selected embodiments, the ESD conductor 24 may encircle the sensor circuitry 16, 18, 20 to eliminate discharge paths between the sensing side 14 and the sensor circuitry 16, 18, 20. Nevertheless, the ESD conductor 24 is not limited to this shape but may include various continuous and non-continuous shapes and may, in certain embodiments, only partially surround the circuitry 16, 18, 20. Similarly, the ESD conductor 24 may be placed at or near a perimeter of the substrate 11 to maximize the space available for the circuitry 16, 18, 20.

The ESD conductor 24 may be made of various conductive materials including, for example, aluminum, gold, nickel, copper, or the like. In selected embodiments, the ESD conductor 24 is made of the same conductive material as that used for traces and other conductors of the fingerprint sensing circuit 10. Thus, the ESD conductor 24 may be manufactured at low cost using standard chip on flex (COF) or other suitable manufacturing processes.

Figure 2:
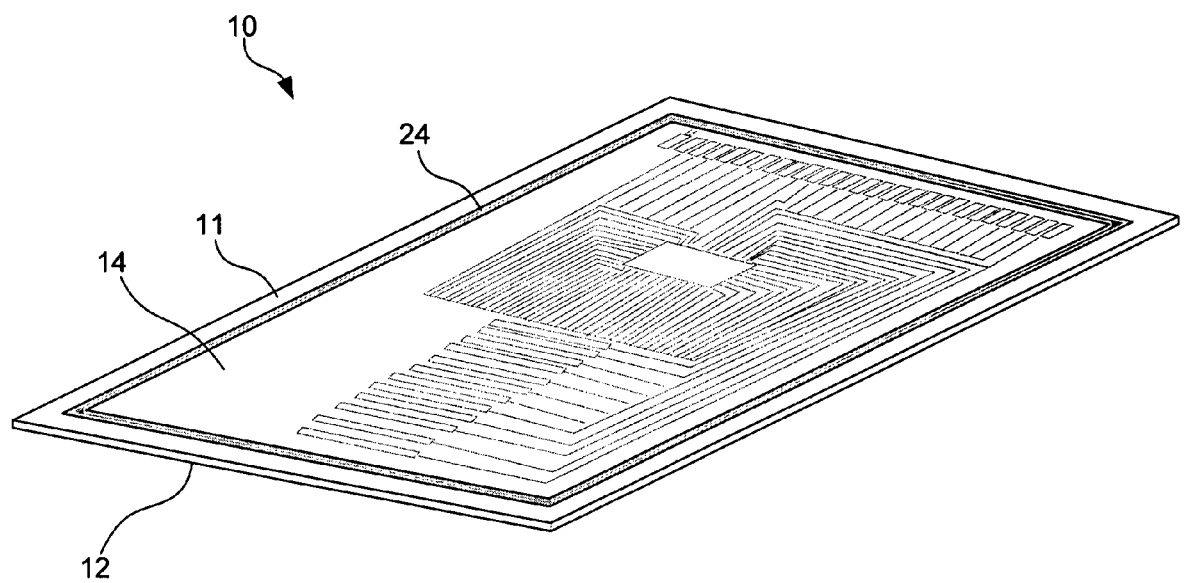
FIG. 2 is a perspective view of another embodiment of a fingerprint sensing circuit having a substrate and an ESD conductor coupled to the opposite side of the substrate.

Referring to FIG. 2, in other embodiments, an ESD conductor 24 may be placed on the sensing side 14 of the substrate 11 (In the illustrated embodiment, the fingerprint sensing circuit 10 is flipped over such that the sensing side 14 faces upwards). For example, an ESD conductor 24 may be configured to encircle the perimeter of the sensing side 14. Such an embodiment may be advantageous in certain situations. For example, some application may require interconnect pads or pins that reach the edge of the substrate 11 in order to properly interface or mate with a host system. In such applications, it may be infeasible to place an ESD conductor 24 around the sensor components 16, 18, 20 on the circuit side 12 of the substrate 11. Thus, in certain embodiments, an ESD conductor 24 may be placed around the perimeter of the sensing side 14 to provide a similar function.

Figure 3:
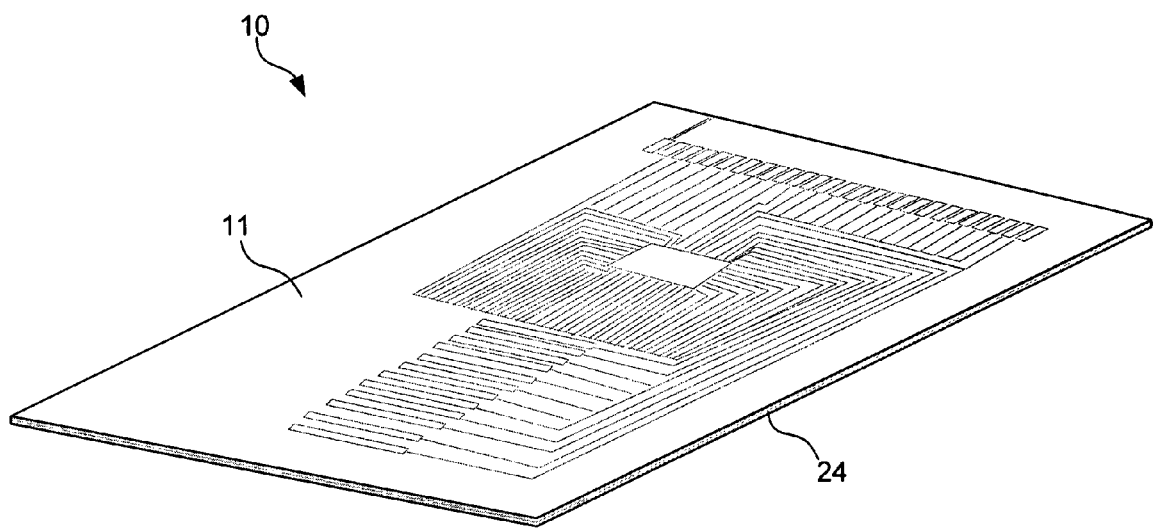
FIG. 3 is a perspective view of another embodiment of a fingerprint sensing circuit having a substrate and an ESD conductor coupled to an edge of the substrate.

Referring to FIG. 3, in other embodiments, an ESD conductor 24 may be provided along an edge of the substrate 11 to prevent migration of electrostatic charge from one side of the substrate 11 to the other.

Figure 4A:
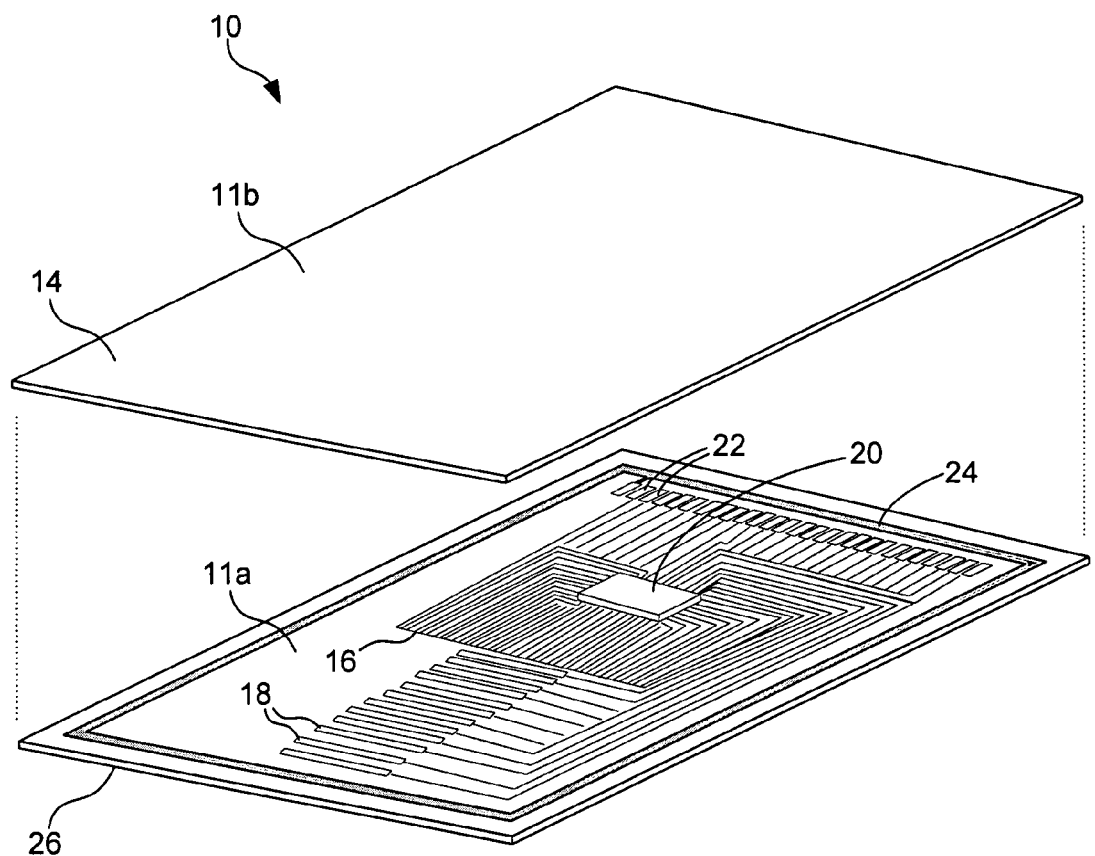
FIG. 4A is a perspective view of an embodiment of a fingerprint sensing circuit having multiple layers.
Figure 4B:
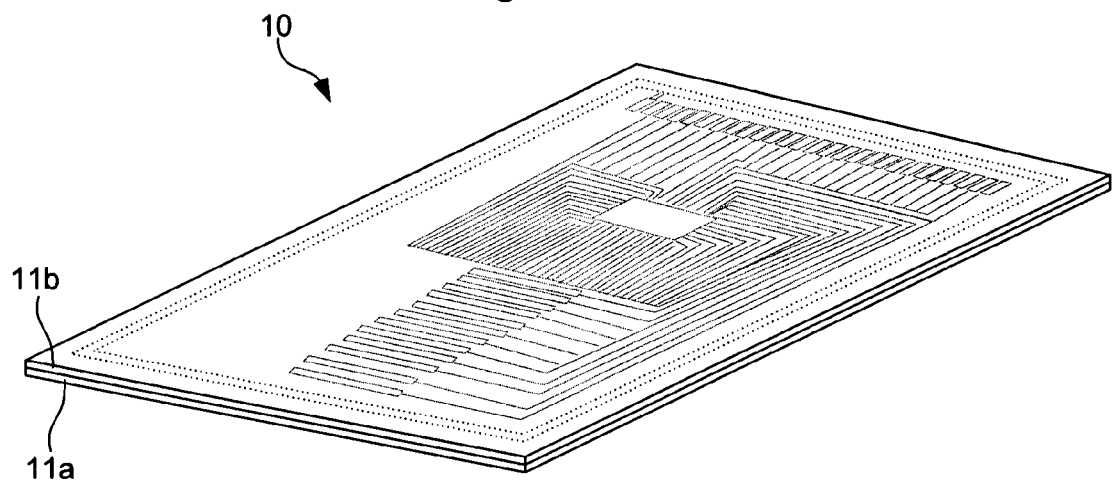
FIG. 4B is a perspective view of the fingerprint sensing circuit of FIG. 4A showing the layers sandwiched together.

Referring to FIGS. 4A and 4B, in another embodiment, a fingerprint sensing circuit 10 in accordance with the invention may include several layers 11a, 11b, or substrates 11a, 11b, sandwiched together. For example, in one embodiment, fingerprint sensor components 16, 18, 20 may be printed or otherwise attached to a first non-conductive substrate 11a. The substrate 11a may include various flexible or rigid substrate materials suitable for receiving a conductive circuit. In certain embodiments, the substrate 11a and circuit components 16, 18, 20 are provided in the form of a conventional printed circuit board (PCB).

A second non-conductive layer 11b or substrate 11b may be placed over the circuit components 16, 18, 20 of the first layer 11a. For example, a flexible polyimide layer 11b such as a layer 11b of Kapton® may be used to cover the circuit components 16, 18, 20, sandwiching the circuit components 16, 18, 20 between the two layers 11a, 11b. In selected embodiments, interconnect pads 22 may be made accessible on an underside 26 of the substrate 11a or through apertures in the polyimide layer 11b.

To read a fingerprint, a user's finger may be swiped across a sensing side 14 of the layer 11b without directly touching the circuit components 16, 18, 20. Thus, the user's finger may be electrically and mechanically isolated from the circuit components 16, 18, 20. The sensors 16, 18 beneath the layer 11b may read the fingerprint by detecting changes in capacitance as the finger is swiped across the layer 11b.

To prevent electrostatic charge from building up on the surface 11b and discharging to the circuit components 16, 18, 20, an ESD conductor 24 may be provided on the substrate 11a. In selected embodiments, the ESD conductor 24 may be printed on the substrate 11a with the conductive traces of the sensor components 16, 18, 20. If electrostatic charges builds up to a point where it attempts to discharge around the edge of the layer 11b, the ESD conductor 24 may be used to dissipate the charge to a known potential. In other contemplated embodiments, the ESD conductor 24 may be placed on the second layer 11b.

Figure 5:
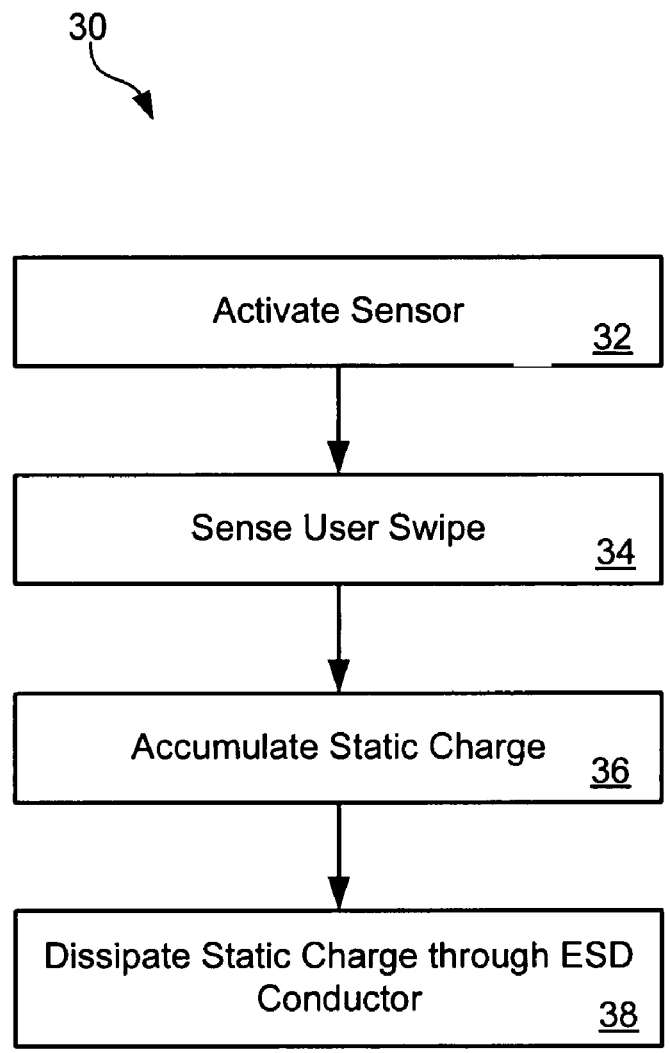
FIG. 5 is a flow diagram of one embodiment of a method for dissipating electrostatic charge in a fingerprint sensing circuit.

Referring to FIG. 5, in certain embodiments, a method 30 for dissipating electrostatic charge in a fingerprint sensing circuit 10 may include initially activating 32 the fingerprint sensor. This may include, for example, activating the image sensor 16, velocity sensor 18, and sensor IC 20. The fingerprint sensor 10 may then be used to sense 34 a user's fingerprint as it is swiped across the sensor 10. As mentioned, this may cause an electrostatic charge to accumulate 36 on the sensor 10 which may then be dissipated through the ESD conductor 24.

Figure 6:
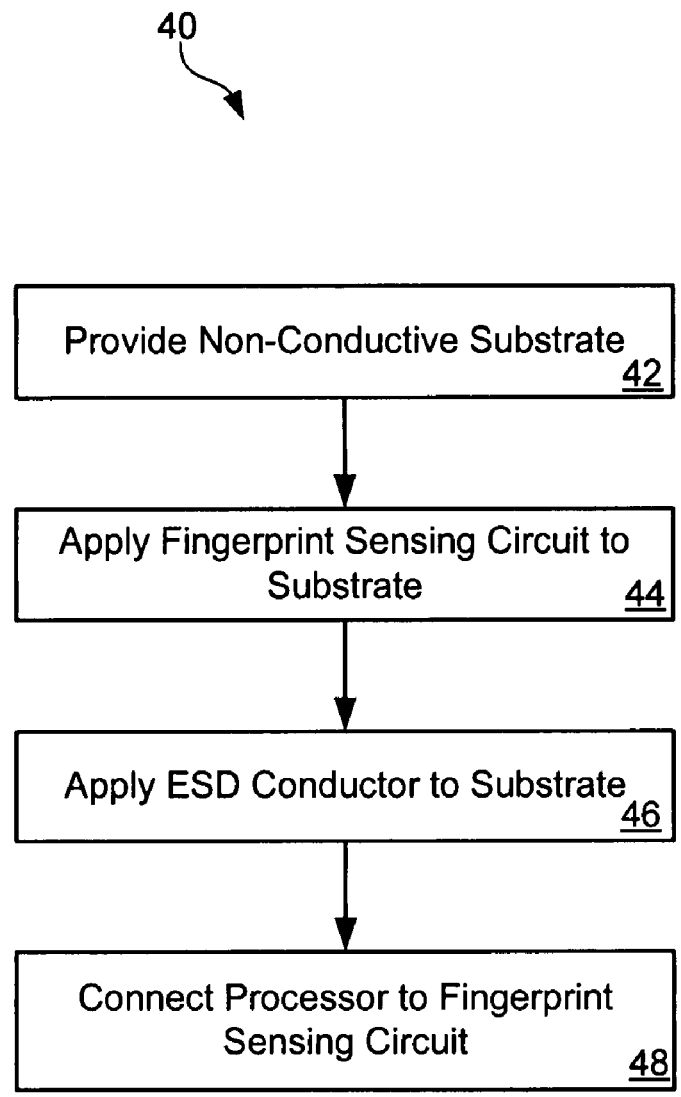
FIG. 6 is a flow diagram of one embodiment of a method for producing an ESD-protected fingerprint sensing circuit in accordance with the invention.

Referring to FIG. 6, in certain embodiments, a method 40 for producing an ESD-protected fingerprint sensing circuit 10 in accordance with the invention may include providing 42 a non-conductive substrate 11 and applying 44 a fingerprint sensing circuit to the substrate 11 using any suitable lithographic or application technique. An ESD conductor 24 may be applied 46 to the substrate 11 before, concurrently with, or after applying 44 the fingerprint sensing circuit components. The fingerprint sensing circuit 10 may then be connected 48 to a processor or other host system.

It should be understood that the ESD conductor 24 disclosed herein is not limited to fingerprint sensing technology, to flexible substrates, or to any single manufacturing process. An ESD conductor 24 in accordance with the invention may be applied to various non-conductive surfaces that can accommodate a conductive pattern, including but not limited to COF, ICs, flexible circuit boards, printed circuit boards, or the like. Furthermore, the invention is not limited to devices intended for human touch but may be used to protect circuitry coming into contact with any static generating body such as humans, assembly equipment, animals, or the like. Nevertheless, the invention may be particularly useful to protect sensitive circuitry associated with devices intended for human touch, including but not limited to touch pads, touch screens, touch panels, keyboards, keypads, mice, joysticks, trackballs, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fingerprint sensor comprising:
    a non-conductive substrate having a sensing surface on a sensing surface side of the non-conductive substrate, across which a user swipes a finger in order to sense a fingerprint;
    a fingerprint sensing circuit having fingerprint sensing components formed on a circuit component surface on a circuit component side of the non-conductive substrate, opposing the sensing surface on the sensing surface side of the non-conductive substrate, wherein the fingerprint sensor senses a fingerprint when the finger is swiped across the sensing surface; and
    an electrostatic discharge conductor formed on the non-conductive substrate intermediate an area of electrostatic charge formed on the sensing surface and the fingerprint sensing circuit components formed on the circuit component surface.

2. The sensor according to claim 1, wherein the electrostatic discharge conductor at least partially encircles encircles the fingerprint sensing circuit components.

3. The sensor according to claim 1, wherein the electrostatic discharge conductor encircles—an—area on the sensing surface where a fingerprint is swiped.

4. The sensor according to claim 1, wherein the electrostatic discharge conductor is applied to an edge surface of the non-conductive substrate intermediate the sensing surface and the circuit component surface.

5. The sensor according to claim 1, wherein the sensing circuit components and non-conductive substrate form one of a chip on flex (COF), a flexible circuit board, a printed circuit board (PCB), and an integrated circuit (IC).

6. The sensor according to claim 1, further comprising a processor operably coupled to the sensing circuit configured to process fingerprint data received from the sensing circuit.

7. The sensor according to claim 1, wherein the electrostatic discharge conductor is made of the same material as conductive traces of the sensing circuit.

8. The sensor according to claim 1, wherein the sensing circuit comprises at least one of an image sensor, a velocity sensor, and a sensor IC.

9. An electrostatic discharge-protected fingerprint sensor comprising:
- a non-conductive substrate having a sensing surface and a circuit component surface on opposite sides of the non-conductive substrate wherein an electrostatic charge accumulates on the sensing surface as a result of contacting a finger of a user on the sensing surface of the non-conductive substrate;
- a fingerprint sensing circuit formed on the circuit component surface of the non-conductive substrate opposing the sensing surface and sensitive to electrostatic charge accumulating in an electrostatic charge region on the sensing surface; and
- an electrostatic discharge conductor formed on the non-conductive substrate intermediate the electrostatic charge region of the sensing surface and the circuit component surface.

10. The electrostatic discharge-protected fingerprint sensor according to claim 9, wherein the non-conductive substrate is flexible.

11. The electrostatic discharge-protected fingerprint sensor according to claim 10, wherein the non-conductive substrate comprises polyimide.

12. The electrostatic discharge-protected fingerprint sensor according to claim 9, wherein the electrostatic discharge conductor at least partially encircles the fingerprint sensing circuit.

13. The electrostatic discharge-protected fingerprint sensor according to claim 9, wherein the fingerprint sensing circuit and the non-conductive substrate form one of—a—chip on flex (COF), a flexible circuit board, a printed circuit board (PCB), and an integrated circuit (IC).

14. The electrostatic discharge-protected fingerprint sensor according to claim 9, further comprising a processor operably coupled to the fingerprint sensing circuit.

15. The electrostatic discharge-protected fingerprint sensor according to claim 9, wherein the electrostatic discharge conductor is made of the same material as conductive traces of the fingerprint sensing circuit.

16. The electrostatic discharge-protected fingerprint sensor according to claim 9, wherein the fingerprint sensing circuit comprises at least one column driver.

17. The electrostatic discharge-protected fingerprint sensor according to claim 9, wherein the fingerprint sensing circuit cooperates with at least one of a touch pad, touch screen, touch panel, keyboard, keypad, mouse, joystick and trackball.

18. A fingerprint sensor comprising:
- a first non-conductive substrate;
- fingerprint sensing circuit components formed on a circuit component side of the first non-conductive substrate, the circuit component side of the first non-conductive substrate opposing a sensor side of the first non-conductive substrate;
- a second non-conductive substrate covering at least a portion of the first non-conductive substrate providing a sensing area, on a sensing surface on a sensing side of the second non-conductive substrate, onto which a user applies a finger; and
- an electrostatic discharge conductor formed on one of the first non-conductive substrate and the second non-conductive substrate, intermediate an area of electrostatic charge formed in the sensing area on the sensing surface of the second non-conductive substrate and the fingerprint sensing circuit components formed on the circuit component side of the first non-conductive substrate.

19. The sensor according to claim 18, wherein the electrostatic discharge conductor is formed on the first non-conductive substrate.

20. The sensor according to claim 18, wherein the electrostatic discharge conductor is formed on the second non-conductive substrate.

21. The sensor according to claim 18, wherein the electrostatic discharge conductor encircles the fingerprint sensor circuit components.

22. The sensor according to claim 18, wherein the electrostatic discharge conductor only partially encircles the fingerprint sensor circuit components.

23. The sensor according to claim 18, wherein the second non-conductive substrate comprises polyimide.

24. A fingerprint sensor comprising:
- a non-conductive substrate providing a sensing surface onto which a user applies a finger to be sensed;
- a fingerprint sensing circuit applied to a circuit component surface of the non-conductive substrate, opposite the sensing surface, configured to sense a fingerprint, wherein the fingerprint sensing circuit further comprises a velocity sensor and an image sensor; and
- an electrostatic discharge conductor formed on the non-conductive substrate, intermediate an area of electrostatic charge accumulated on the sensing surface and the sensing circuit component surface of the nonconductive substrate.

25. A method of protecting a fingerprint sensor from an accumulating electrostatic charge comprising:
- forming a non-conductive substrate having a sensing surface on a sensing surface side of the non-conductive substrate, allowing for a user to swipe a finger in order to sense a fingerprint;
- forming a fingerprint sensing circuit having fingerprint sensing components on a circuit component surface on a circuit component side of the non-conductive substrate, opposing the sensing surface on the sensing surface side of the non-conductive substrate, allowing for the fingerprint sensor to sense a fingerprint when the finger is swiped across the sensing surface; and
- forming an electrostatic discharge conductor on the non-conductive substrate intermediate an area of electrostatic charge accumulated on the sensing surface and the fingerprint sensing circuit components formed on the circuit component surface.

* * * * *